(12) United States Patent
Onodera et al.

(10) Patent No.: US 9,217,352 B2
(45) Date of Patent: Dec. 22, 2015

(54) EXHAUST GAS PURIFICATION SYSTEM (75) Inventors: Takao Onodera, Fujisawa (JP); Mami Hotta, Fujisawa (JP); Masanobu Minezawa, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 487 days.

(21) Appl. No.: 13/697,912

(22) PCT Filed: May 16, 2011

(86) PCT No.: PCT/JP2011/061206
§ 371 (c)(1),
(2), (4) Date: Nov. 14, 2012

(87) PCT Pub. No.: WO2011/145568
PCT Pub. Date: Nov. 24, 2011

(65) Prior Publication Data
US 2013/0058833 A1   Mar. 7, 2013

(30) Foreign Application Priority Data

May 17, 2010   (JP) ................. 2010-113756

(51) Int. Cl.
*F01N 3/18* (2006.01)
*B01D 53/94* (2006.01)
*F01N 3/20* (2006.01)
*F01N 3/035* (2006.01)
*F01N 3/10* (2006.01)
*F02D 41/02* (2006.01)
*F01N 13/00* (2010.01)

(52) U.S. Cl.
CPC ............. *F01N 3/208* (2013.01); *F01N 3/035* (2013.01); *F01N 3/106* (2013.01); *F01N 13/009* (2014.06); *F02D 41/029* (2013.01); *F01N 2610/02* (2013.01); *F01N 2610/14* (2013.01); *F01N 2610/1493* (2013.01); *F01N 2900/1402* (2013.01); *F01N 2900/1404* (2013.01); *F01N 2900/1622* (2013.01); *Y02T 10/24* (2013.01)

(58) Field of Classification Search
None
See application file for complete search history.

(56) References Cited

U.S. PATENT DOCUMENTS

| 2009/0101656 A1* | 4/2009 | Leonard .................. 220/562 |
| 2010/0071349 A1* | 3/2010 | Kitazawa .................. 60/277 |
| 2010/0242439 A1 | 9/2010 | Domon et al. |

FOREIGN PATENT DOCUMENTS

| JP | 2000-303826 | 10/2000 |
| JP | 2003-222019 | 8/2003 |

(Continued)

OTHER PUBLICATIONS

Hiranuma et al. JP 2006-342735—specification machine translated (2006).*

(Continued)

*Primary Examiner* — Walter D Griffin
*Assistant Examiner* — Jelitza Perez
(74) *Attorney, Agent, or Firm* — Staas & Halsey LLP (57) ABSTRACT

An exhaust gas purification system includes a dosing control unit that controls a supply module to supply urea water between a dosing valve and a urea tank in order to remove urea water accumulated in the dosing valve, when receiving a diesel particulate filter regeneration authorization request from an engine control unit, and then transmits the authorization to the engine control unit, when determining that an $NH_3$ amount of a selective reduction catalyst is less than or equal to a prescribed value.

10 Claims, 4 Drawing Sheets

(56) References Cited

FOREIGN PATENT DOCUMENTS

| JP | 2005-264731 | 9/2005 |
|---|---|---|
| JP | 2005-273503 | 10/2005 |
| JP | 2006-342735 | 12/2006 |
| JP | 2008-101564 | 5/2008 |
| JP | 2009-97479 | 5/2009 |
| JP | 2010-38034 | 2/2010 |
| JP | 2010-101262 | 5/2010 |

OTHER PUBLICATIONS

Naohisa et al. JP2005-273503A specification machine translated (2005).*
Written Opinion of the International Searching Authority mailed Jul. 26, 2011 in corresponding International Application No. PCT/JP2011/061206.
Patent Abstracts of Japan, Publication No. 2008-101564, Published May 1, 2008.
Patent Abstracts of Japan, Publication No. 2009-097479, Published May 7, 2009.
Patent Abstracts of Japan, Publication No. 2010-038034, Published Feb. 18, 2010.
Patent Abstracts of Japan, Publication No. 2010-101262, Published May 6, 2010.
International Search Report of PCT/JP2011/061206 mailed Jul. 26, 2011.
Patent Abstracts of Japan, Publication No. 2000-303826, Published Oct. 31, 2000.
Patent Abstracts of Japan, Publication No. 2003-222019, Published Aug. 8, 2003.
Patent Abstracts of Japan, Publication No. 2005-264731, Published Sep. 29, 2005.
Patent Abstracts of Japan, Publication No. 2005-273503, Published Oct. 6, 2005.
Patent Abstracts of Japan, Publication No. 2006-342735, Published Dec. 21, 2006.

* cited by examiner

EXHAUST GAS PURIFICATION SYSTEM

CROSS-REFERENCE TO RELATED APPLICATIONS

This application claims the foreign priority benefit of Japanese Application No. 2010-113756 filed May 17, 2010, the contents of which are incorporated herein by reference, which serves as priority for PCT Application No. JP2011/061206 filed May 16, 2011.

TECHNICAL FIELD

The present invention relates to an exhaust gas purification system that traps a PM (Particulate Matter) in exhaust gas of a diesel engine and purifies and exhausts NOx.

BACKGROUND ART

As an exhaust gas purification system that purifies and exhausts exhaust gas of a diesel engine, an exhaust gas purification system in which a DPF (Diesel Particulate Filter) and an SCR (Selective Catalytic Reduction) device are connected to an exhaust pipe has been developed.

The exhaust gas purification system uses the DPF to trap a PM in exhaust gas and uses an SCR system including the SCR device to supply urea water stored in a urea tank to an exhaust gas upstream of SCR, generate $NH_3$ by the heat of the exhaust gas, and reduce and purify NOx on an SCR catalyst by the $NH_3$ (see, for example, Patent Document 1).

Since the PM trapped by the DPF causes filter clogging, it is necessary to appropriately oxidate and remove the trapped and deposited PM for regeneration.

When an exhaust gas pressure sensor detects a differential pressure before and after the DPF and the differential pressure reaches an upper limit value, an ECM (Engine Control Module) automatically or manually detects the filter clogging. In this case, a DPF warning lamp provided in a cabin is lighted and a driver presses a regeneration execution switch, thereby starting DPF regeneration.

The DPF regeneration is performed by raising a temperature of the exhaust gas to about 600° C. and burning and removing the PM trapped by the DPF by the high-temperature exhaust gas. That is, in the DPF regeneration, since the high-temperature exhaust gas is flowed into the exhaust pipe, the DPF and the SCR device connected to the exhaust pipe are exposed to the high-temperature exhaust gas.

By the way, due to the nature of the SCR catalyst, the amount of $NH_3$ capable of being accumulated by the SCR catalyst decreases as the temperature rises. Therefore, when the DPF regeneration is started with a large amount of $NH_3$ accumulated in the SCR catalyst, the SCR catalyst is heated by the high-temperature exhaust gas, so that a so-called "$NH_3$ slip" phenomenon in which the $NH_3$ accumulated in the SCR catalyst is released occurs.

In order to avoid the $NH_3$ slip, the DPF regeneration is performed after reducing the amount of $NH_3$ accumulated in the SCR catalyst by stopping the supply of the urea water prior to the DPF regeneration and purifying the exhaust gas solely by the $NH_3$ accumulated in the SCR catalyst.

PRIOR ART DOCUMENTS

Patent Document 1: Japanese Patent Application Publication No. 2000-303826

DISCLOSURE OF THE INVENTION

Problems to Be Solved By the Invention

Since the supply of the urea water is stopped in the DPF regeneration in this manner, the urea water is left accumulated in a dosing valve (urea injection device, dosing module) for injecting the urea water in the DPF regeneration. Since the dosing valve is disposed to face the exhaust pipe, the dosing valve is exposed to the high-temperature exhaust gas in the DPF regeneration. At this time, the urea water accumulated in the dosing valve is also heated to a high temperature.

Figure 5:
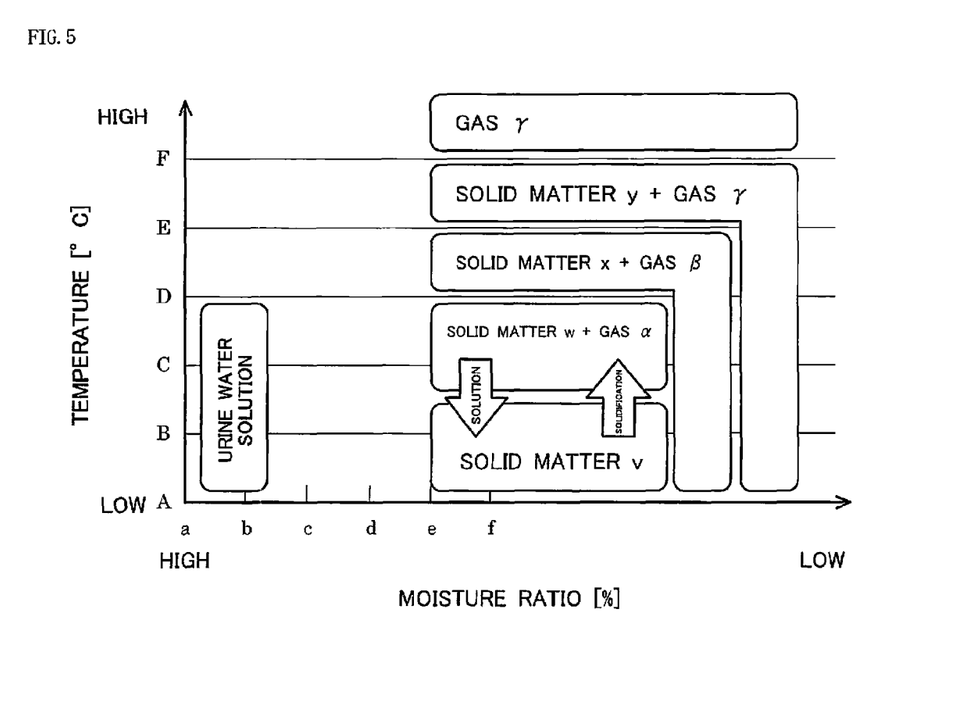
FIG. 5 is a diagram showing a state change of urea water according to a temperature change.

As shown in FIG. 5, when the urea water is heated to higher than or equal to a boiling point of C° C., moisture thereof starts to vaporize and gas α is generated through a solid matter w. The gas α is crystallized at about D° C., and a solid matter x is generated. Within a temperature range of C° C. to D° C., the solid matter w, the gas α, and the solid matter x are left mixed with each other.

Figure 6:
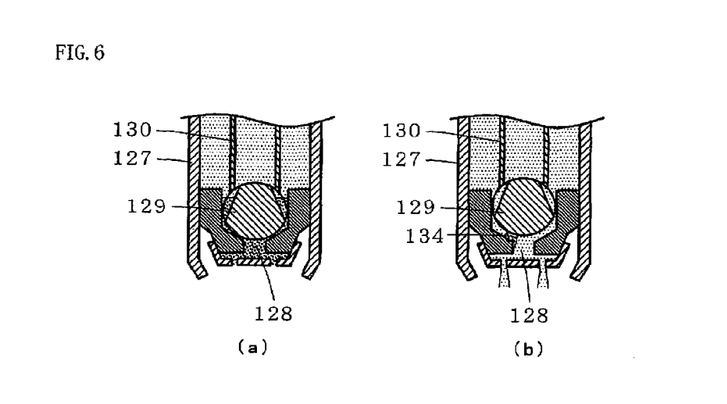
FIGS. 6(a) and 6(b) are cross-sectional views for describing a failure of a dosing valve.

Therefore, when the urea water inside the dosing valve is heated by the high-temperature exhaust gas in the DPF regeneration, the urea water inside the dosing valve is crystallized to adhere to a valve body 129 as shown in FIG. 6(*a*), or a solid matter 134 crystallized from the urea water is caught between the valve body 129 and a valve sheet of a cylinder 127 as shown in FIG. 6(*b*), so that the injection of the urea water cannot be stopped. Thus, there is a fear that the dosing valve will malfunction and a failure of proper urea water injection control will occur.

SUMMARY OF THE INVENTION

Therefore, an object of the present invention is to provide an exhaust gas purification system that can prevent the adhesion of the urea water in the dosing valve during the DPF regeneration.

The present invention has been made in order to achieve the above object, and relates to an exhaust gas purification system including: a DPF connected to an exhaust pipe; an SCR device connected to a downstream side of the DPF; a dosing valve for injecting urea water on an upstream side of the SCR device; a supply module for suctioning urea water inside a urea tank, supplying the urea water to the dosing valve, and returning urea water inside the dosing valve to the urea tank; a dosing control unit ("DCU") for controlling the dosing valve and the supply module in order to determine an amount of urea water to be injected from the dosing valve according to an $NH_3$ amount accumulated in an SCR catalyst and an NOx amount in exhaust gas; and an ECM for detecting a PM deposition amount in the DPF and performing control of DPF regeneration by flowing high-temperature exhaust gas to the DPF in order to regenerate the DPF, wherein the ECM transmits a DPF regeneration authorization request to the DCU prior to the DPF regeneration, the DCU determines an $NH_3$ amount of the SCR catalyst and transmits a DPF regeneration authorization to the ECM when the $NH_3$ amount is less than or equal to a prescribed value, and the ECM receives the DPF regeneration authorization and executes the DPF regeneration, wherein the DCU controls the supply module to inject or return the urea water inside the dosing valve to the urea tank in order to remove the urea water accumulated in the dosing valve when receiving the DPF regeneration authorization request from the ECM, and then transmits the DPF regeneration authorization to the ECM when determining that the $NH_3$ amount of the SCR catalyst is less than or equal to the prescribed value.

In the exhaust gas purification system, the DCU can intermittently open the dosing valve in order to prevent adhesion of the urea water in the dosing valve, when the exhaust gas temperature is less than an activation temperature of the SCR catalyst and is more than or equal to a crystallization temperature of the urea water.

In the exhaust gas purification system, the DCU can open the dosing valve and control the supply module to return the urea water inside the dosing valve to the urea tank in order to prevent adhesion of the urea water in the dosing valve, when the exhaust gas temperature is less than an activation temperature of the SCR catalyst and is more than or equal to a crystallization temperature of the urea water.

In the exhaust gas purification system, the activation temperature of the SCR catalyst can be more than or equal to 190° C., and the crystallization temperature of the urea water can be more than or equal to 104° C.

In the exhaust gas purification system, the supply module can be provided between the urea tank and the dosing valve, and include a supply module ("SM") pump for pumping the urea water and a reverting valve for switching a liquid feed passage by the SM pump.

According to the present invention, the adhesion of the urea water in the dosing valve during the DPF regeneration can be prevented.

DETAILED DESCRIPTION

Hereinafter, preferred embodiments of the present invention will be described with reference to the accompanying drawings.

First, an exhaust gas purification system mounted on a vehicle will be described.

Figure 1:
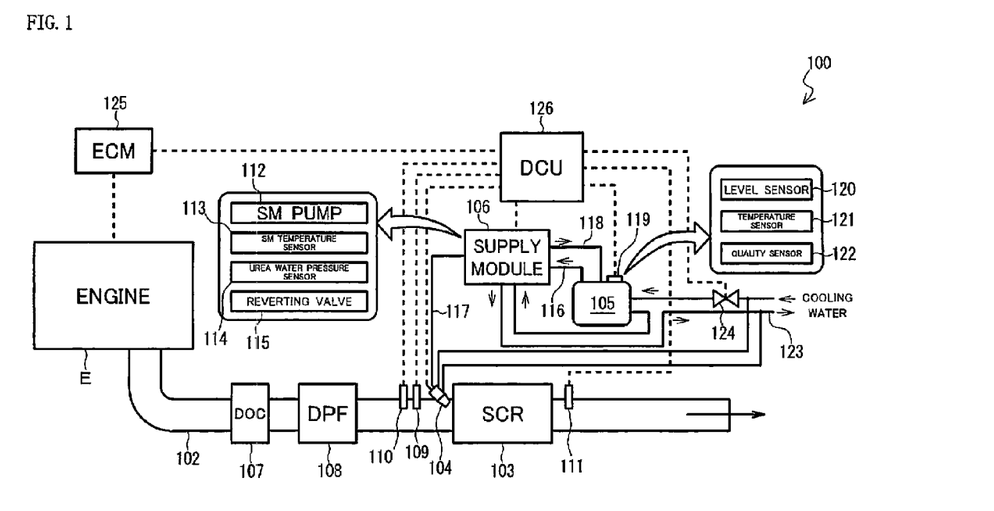
FIG. 1 is a schematic view showing an exhaust gas purification system of the present invention.

As shown in FIG. 1, an exhaust gas purification system 100 mainly includes an SCR device 103 provided at an exhaust pipe 102 of an engine E, a dosing valve (urea injection device, dosing module) 104 disposed to face the exhaust pipe and inject urea water on an upstream side of the SCR device 103 (upstream side of exhaust gas), a urea tank 105 for storing urea water, a supply module 106 for supplying the urea water stored in the urea tank 105 to the dosing valve 104, and a DCU (Dosing Control Unit) 126 for controlling the dosing valve 104, the supply module 106, and the like.

At the exhaust pipe 102 of the engine E, a DOC (Diesel Oxidation Catalyst) 107, a DPF 108, and the SCR device 103 are sequentially arranged from the upstream side to the downstream side of exhaust gas. The DOC 107 generates $NO_2$ by oxidating NO in exhaust gas exhausted from the engine E, and increases a denitrification efficiency in the SCR device 103 by controlling a ratio of NO to $NO_2$ in the exhaust gas. Further, the DPF 108 traps a PM in the exhaust gas.

Since the PM trapped by the DPF 108 causes filter clogging, it is necessary to appropriately oxidate and remove the trapped and deposited PM for regeneration. Therefore, the ECM 125 controlling the engine E detects a PM deposition amount in the DPF 108 and flows high-temperature exhaust gas to DPF 108 for regeneration of the DPF 108 to control the DPF regeneration.

The dosing valve 104 is provided at the exhaust pipe 102 on the upstream side of the SCR device 103. The dosing valve 104 is configured such that an injection nozzle 128 is provided at a cylinder 127 filled with high-pressure urea water, and a valve body 129 plugging the injection nozzle 128 is attached to a plunger 130 (see FIGS. 6(a) and 6(b)). By pulling up the plunger 130 by electrifying a coil, the valve body 129 is separated from the injection nozzle 128, so that the urea water is injected. When electrifying the coil is stopped, the plunger 130 is pulled down by an internal spring force and thus the valve body 129 plugs the injection nozzle 128, so that the injection of the urea water is stopped.

An exhaust gas temperature sensor 109 for measuring a temperature of the exhaust gas in an inlet of the SCR device 103 (SCR inlet temperature) is provided at the exhaust pipe 102 on an upstream side of the dosing valve 104. Further, an upstream side NOx sensor 110 for detecting an NOx concentration in the upstream side of the SCR device 103 is provided on the upstream side of the SCR device 103 (herein, an upstream side of the exhaust gas temperature sensor 109), and a downstream side NOx sensor 111 for detecting an NOx concentration in the downstream side of the SCR device 103 is provided on the downstream side of the SCR device 103.

The supply module 106 includes an SM pump 112 for pumping the urea water, an SM temperature sensor 113 for measuring a temperature of the supply module 106 (temperature of the urea water flowing through the supply module 106), a urea water pressure sensor 114 for measuring a pressure of the urea water in the supply module 106 (pressure in a discharge side of the SM pump 112), and a reverting valve 115 for switching a flow passage of the urea water to switch whether or not to supply the urea water from the urea tank 105 to the dosing valve 104 or return the urea water inside the dosing valve 104 to the urea tank 105. Herein, when the reverting valve 115 is turned off, the urea water from the urea tank 105 is supplied to the dosing valve 104, and when the reverting valve 15 is turned on, the urea water inside the dosing valve 104 is returned to the urea tank 105.

When the reverting valve 115 is switched to supply the urea water to the dosing valve 104, the supply module 106 suctions the urea water inside the urea tank 105 by the SM pump 112 through a liquid feed line (suction line) 116, supplies the urea water to the dosing valve 104 through a pump line (pressure line) 117, and returns surplus urea water to the urea tank 105 through a recovery line (back line) 118.

Further, in a key-off mode (ignition off, vehicle stop), the reverting valve 115 is switched to return the urea water inside the dosing valve 104 to the urea tank 105, so that a malfunction of the dosing valve 104 caused by crystallization of the urea water is prevented. In this specification, control for returning the urea water inside the dosing valve 104 to the urea tank 105 in this manner will be referred to as emptying.

In an emptying mode, the dosing valve 104 is opened in advance and the urea water inside the dosing valve 104 is returned to the urea tank 105, so that the exhaust gas (air) of the exhaust pipe 102 is suctioned from the dosing valve 104 to the urea tank 105.

Figure 2:
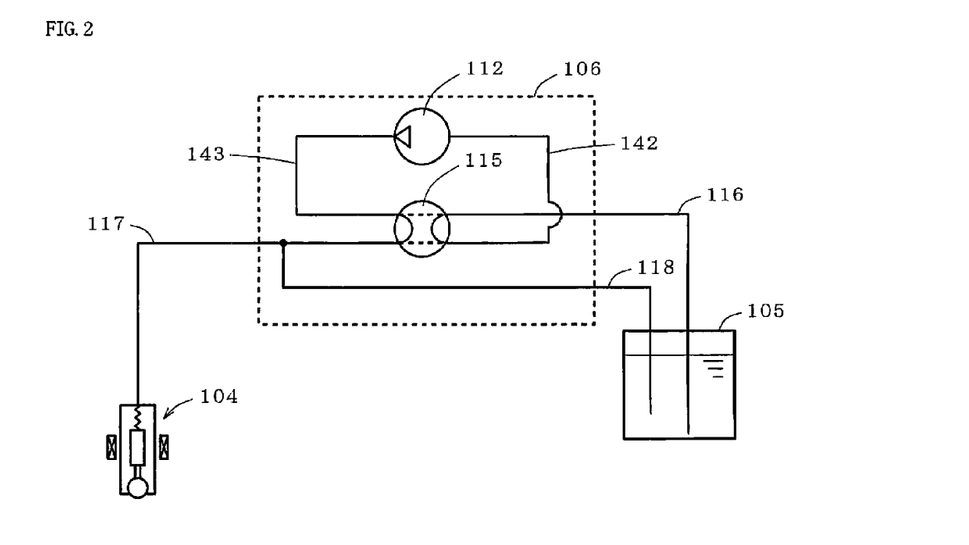
FIG. 2 is a view showing lines around a supply module.

Herein, an example of a line configuration around the supply module 106 will be described.

As shown in FIG. 2, the liquid feed line 116 from inside the urea tank 105 is connected to a suction side of the SM pump 112 through the reverting valve 115 and an inlet line 142. In addition, the SM pump 112 is connected to the dosing valve 104 through an outlet line 143 connected to the discharge side of the SM pump 112 and the reverting valve 115.

Herein, the reverting valve 115 may be switched between a line represented by a solid line in FIG. 2 and a line represented by a broken line in FIG. 2. This makes it possible to perform the supply of the urea water from the urea tank 105 to the dosing valve 104 and the recovery of the urea water from the dosing valve 104 to the urea tank 105.

The recovery line 118 is connected to the pump line 117 connected to the dosing valve 104, and is configured to return the urea water to the urea tank 105.

In addition, this line configuration is merely an example, and is not limited to the above-described configuration.

The urea tank 105 is provided with an SCR sensor 119. The SCR sensor 119 includes a level sensor 120 for measuring a liquid surface height (level) of the urea water inside the urea tank 105, a temperature sensor 121 for measuring a temperature of the urea water inside the urea tank 105, and a quality sensor 122 for measuring a quality of the urea water inside the urea tank 105. The quality sensor 122 detects the quality of the urea water inside the urea tank 105 by detecting a concentration of the urea water or detecting whether or not a heterogeneous mixture is mixed in the urea water, for example, from a propagation speed of an ultrasonic wave or an electrical conductivity.

A cooling line 123 for circulating cooling water for cooling the engine E is connected to the urea tank 105 and the supply module 106. The cooling line 123 performs heat exchange between the cooling water flowing through the urea tank 105 into the cooling line 123 and the urea water inside the urea tank 105. Likewise, the cooling line 123 performs heat exchange between the cooling water flowing through the supply module 106 into the cooling line 123 and the urea water inside the supply module 106.

The cooling line 123 is provided with a tank heater valve (coolant valve) 124 for switching whether or not to supply the cooling water to the urea tank 105 and the supply module 106. In addition, although the cooling line 123 is also connected to the dosing valve 104, the cooling water is supplied to the dosing valve 104 regardless of the on/off of the tank heater valve 124. In addition, although not shown in FIG. 1 for simplicity, the cooling line 123 is disposed along the liquid feed line 116, the pump line 117, and the recovery line 118 through which the urea water flows.

Figure 3:
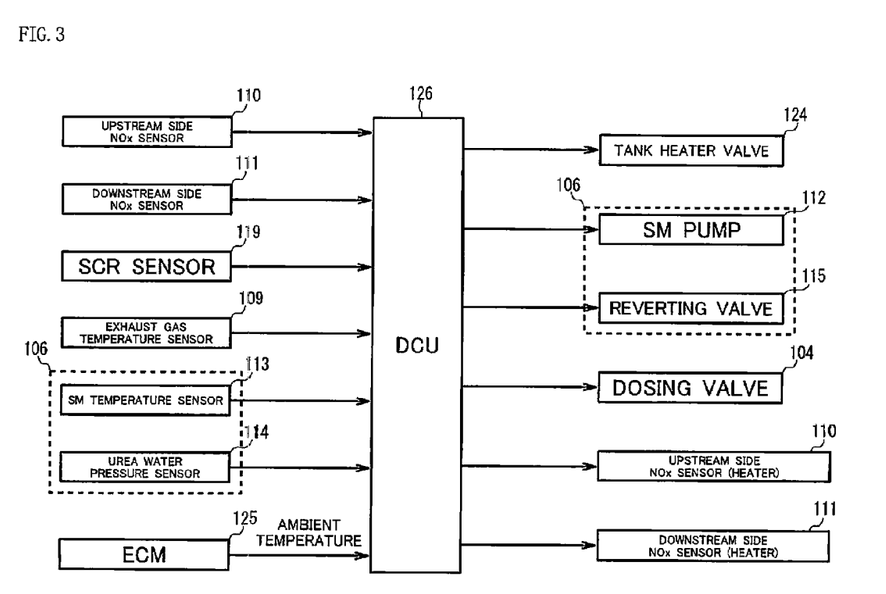
FIG. 3 is a diagram showing an input/output configuration of a DCU.

FIG. 3 shows an input/output configuration diagram of the DCU 126.

As shown in FIG. 3, the upstream side NOx sensor 110, the downstream side NOx sensor 111, the SCR sensor 119 (level sensor 120, temperature sensor 121, quality sensor 122), the exhaust gas temperature sensor 109, the SM temperature sensor 113 and the urea water pressure sensor 114 of the supply module 106, and an input signal line from the ECM 125 controlling the engine E is connected to the DCU 126. Signals of the ambient temperature and engine parameters (the number of rotations of the engine, and the like) are input from the ECM 125.

Further, output signal lines to the tank heater valve 124, the SM pump 112 and the reverting valve 115 of the supply module 106, the dosing valve 104, a heater of the upstream side NOx sensor 110, and a heater of the downstream side NOx sensor 111 are connected to the DCU 126. Further, the input/output of signals between the DCU 126 and the respective members may be either the input/output through separate signal lines or the input/output through a CAN (Controller Area Network).

The DCU 126 estimates an amount of NOx in the exhaust gas based on the engine parameter signals from the ECM 125 and the temperature of the exhaust gas from the exhaust gas temperature sensor 109, and determines an amount of urea water to be injected from the dosing valve 104 based on the estimated amount of NOx in the exhaust gas and the $NH_3$ amount accumulated in the SCR catalyst. In addition, when the determined amount of urea water is injected by the dosing valve 104, the DCU 126 controls the dosing valve 104 and the supply module 106 based on the detection value of the upstream side NOx sensor 110 to adjust the amount of urea water to be injected from the dosing valve 104. Further, an $NH_3$ amount of the SCR catalyst may be estimated from, for example, the measurement values of the upstream side NOx sensor 110 and the downstream side NOx sensor 111.

By the way, in the exhaust gas purification system 100, the ECM 125 transmits a DPF regeneration authorization request to the DCU 126 prior to DPF regeneration. The DCU 126 determines an $NH_3$ amount of the SCR catalyst, and transmits a DPF regeneration authorization to the ECM 125 when the $NH_3$ amount of the SCR catalyst is less than or equal to a prescribed value. The ECM 125 receives the DPF regeneration authorization and performs the DPF regeneration.

More specifically, when receiving the DPF regeneration authorization request from the ECM 125, the DCU 126 stops the injection of the urea water by the dosing valve 104 in order to make the $NH_3$ amount of the SCR catalyst less than or equal to the prescribed value. Accordingly, the exhaust gas is purified only by the $NH_3$ accumulated in the SCR catalyst, and the $NH_3$ amount of the SCR catalyst decreases. When the $NH_3$ amount of the SCR catalyst decreases to be less than or equal to the prescribed value, the DCU 126 transmits a DPF regeneration authorization to the ECM 125. Then, when receiving the DPF regeneration authorization from the DCU 126, the ECM 125 starts DPF regeneration.

In this manner, the exhaust gas purification system 100 stops the injection of the urea water by the dosing valve 104 to make the $NH_3$ amount of the SCR catalyst less than or equal to the prescribed value prior to the DPF regeneration, thereby preventing the occurrence of $NH_3$ slip caused by the release of the $NH_3$ accumulated in the SCR catalyst by the high-temperature exhaust gas in the DPF regeneration.

However, in the DPF regeneration, since urea water is accumulated in the dosing valve 104 stopping the injection, the urea water is heated by the high-temperature exhaust gas in the DPF regeneration and adheres inside the dosing valve 104, so that there is a possibility that a malfunction of the dosing valve 104 will occur.

Therefore, in the exhaust gas purification system 100 of the present invention, the DCU 126 is configured to control the dosing valve 104 and the supply module 106 to inject the urea water inside the dosing valve 104 in order to remove the urea water accumulated in the dosing valve 104 when receiving the DPF regeneration authorization request from the ECM 125, and then transmit the DPF regeneration authorization to the ECM 125 when determining that the $NH_3$ amount of the SCR catalyst is less than or equal to the prescribed value.

By injecting the urea water inside the dosing valve 104, the urea water inside the dosing valve 104 can be replaced with non-high-temperature urea water from the urea tank 105.

By the way, in addition to the DPF regeneration mode, there is a case where the injection of the urea water from the dosing valve 104 is stopped.

The exhaust gas purification system 100 is generally configured such that the dosing valve 104 is closed when a SCR catalyst temperature (exhaust gas temperature) is less than an activation temperature of the SCR catalyst (for example, 190° C. in this embodiment), and the injection of the urea water from the dosing valve 104 is authorized when the exhaust gas temperature is sufficiently heated to be more than or equal to the activation temperature of the SCR catalyst. Herein, since a sensor for directly measuring the SCR catalyst temperature is not provided in general, the measurement value of the exhaust gas temperature sensor 109 is regarded as the SCR catalyst temperature. That is, the exhaust gas temperature is equal to the SCR catalyst temperature.

Accordingly, the injection of the urea water from the dosing valve 104 is stopped when the exhaust gas temperature is less than the activation temperature of the SCR catalyst. Since the urea water is crystallized at about 104° C. to 160° C., when the exhaust gas temperature is in a temperature range of, for example, 104° C. or more and less than 190° C., the urea water filled into the dosing valve 104 receiving heat of the exhaust gas in the temperature range is crystallized, so that there is a risk of causing a malfunction of the dosing valve 104.

Therefore, in the exhaust gas purification system 100 of the present invention, in addition to the above-described configuration, the DCU 126 is configured to intermittently discharge a small amount of urea water from the dosing valve 104 by opening the dosing valve 104 intermittently (for example, every three minutes), in order to prevent the adhesion of the urea water in the dosing valve 104, when the exhaust gas temperature is more than or equal to a crystallization temperature of the urea water, even when the exhaust gas temperature is less than the activation temperature of the SCR catalyst.

The DCU 126 is configured to monitor a measurement value of the exhaust gas temperature sensor 109 and intermittently discharge a small amount of urea water from the dosing valve 104 by intermittently opening the dosing valve 104 when the measurement value is more than or equal to the crystallization temperature of the urea water and is less than the activation temperature of the SCR catalyst.

That is, the DCU 126 monitors the measurement value of the exhaust gas temperature sensor 109 to determine whether or not the exhaust gas temperature is more than or equal to the crystallization temperature of the urea water and is less than an injection temperature of the urea water, and intermittently discharges a small amount of urea water from the dosing valve 104 when the exhaust gas temperature is more than or equal to the crystallization temperature of the urea water and is less than the injection temperature of the urea water.

Figure 4:
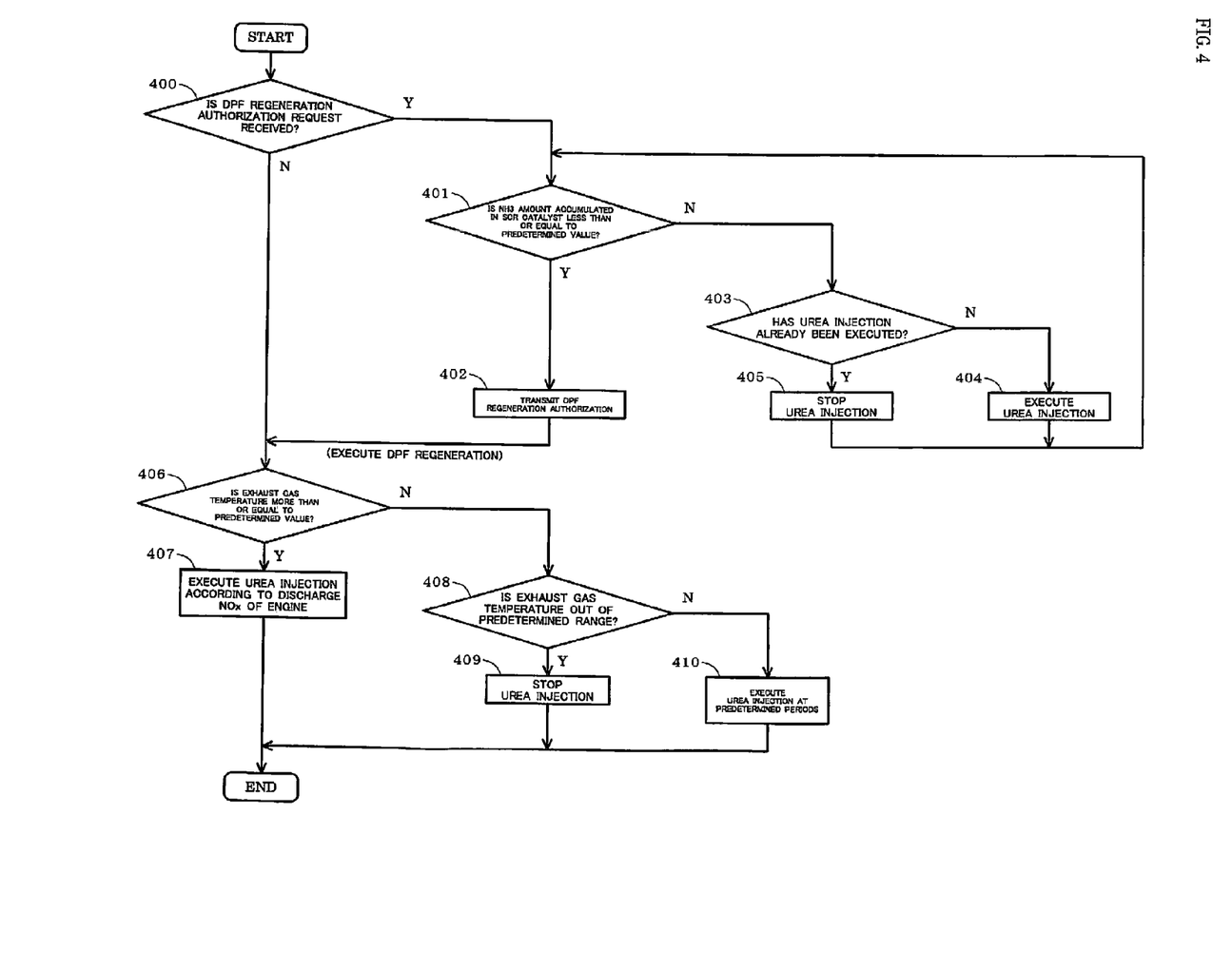
FIG. 4 is a flowchart for describing an operation of the DCU in the exhaust gas purification system of the present invention.

FIG. 4 shows a flowchart summarizing the operation of the DCU 126 that has been described hitherto. The DCU 126 repeats an operation shown below.

As shown in FIG. 4, first, the DCU 126 determines whether or not it has received a DPF regeneration authorization request from the ECM 125 (step 400).

When determining in step 400 that it has received the DPF regeneration authorization request from the ECM 125, the DCU 126 determines whether or not an $NH_3$ amount accumulated in the SCR catalyst is less than or equal to a prescribed value (step 401).

When determining in step 401 that the $NH_3$ amount is less than or equal to the prescribed value, the DCU 126 transmits a DPF regeneration authorization to the ECM 125 (step 402). Further, in general, since an $NH_3$ amount more than the prescribed value is accumulated in the SCR catalyst in order to be able to sufficiently purify the exhaust gas when an NOx amount in the exhaust gas has rapidly changed, it is determined in the first loop that the $NH_3$ amount is more than the prescribed value.

When determining in step 401 that the $NH_3$ amount is more than the prescribed value, the DCU 126 determines whether or not the injection of the urea water from the dosing valve 104 has been executed (step 403).

When determining in step 403 that the injection of the urea water has not been executed, the DCU 126 controls the dosing valve 104 and the supply module 106 to inject a small amount of urea water from the dosing valve 104 (step 404).

On the other hand, when determining in step 403 that the injection of the urea water has been executed, the DCU 126 stops the injection of the urea water from the dosing valve 104 (step 405). Step 403 is to prevent the DPF regeneration from being retarded because a reduction of the $NH_3$ amount of the SCR catalyst is retarded when the injection of the urea water from the dosing valve 104 is executed a plurality of times prior to single DPF regeneration.

Subsequently, the DCU 126 repeats steps 401, 403 and 405 until the $NH_3$ amount accumulated in the SCR catalyst becomes less than or equal to the prescribed value, and transmits the DPF regeneration authorization to the ECM 125 in step 402 when the $NH_3$ amount becomes less than or equal to the prescribed value.

By this operation, since the urea water inside the dosing valve 104 can be discharged prior to the DPF regeneration, the adhesion of the urea water in the dosing valve 104 during the DPF regeneration can be prevented.

When determining in initial step 400 that it has not received the DPF regeneration authorization request from the ECM 125, the DCU 126 determines whether or not the exhaust gas temperature is more than or equal to the activation temperature of the SCR catalyst (step 406).

When determining in step 406 that the exhaust gas temperature is more than or equal to the activation temperature of the SCR catalyst, the DCU 126 starts the injection of the urea water according the NOx amount in the exhaust gas (step 407).

On the other hand, when determining in step 406 that the exhaust gas temperature is not more than or equal to the activation temperature of the SCR catalyst, the DCU 126 determines whether or not the exhaust gas temperature is out of a range more than or equal to the crystallization temperature of the urea water and less than the injection temperature of the urea water (step 408).

When determining in step 408 that the exhaust gas temperature is out of the range more than or equal to the crystallization temperature of the urea water and less than the injection temperature of the urea water, the DCU 126 stops the injection of the urea water (step 409).

On the other hand when determining in step 408 that the exhaust gas temperature is within the range more than or equal to the crystallization temperature of the urea water and less than the injection temperature of the urea water, the DCU 126 executes the injection of the urea water at predetermined periods (for example, every three minutes).

By this operation, since the urea water inside the dosing valve 104 can be discharged prior to the crystallization of the urea water, the adhesion of the urea water in the dosing valve 104 can be prevented when the urea water is not injected by the dosing valve 104.

In short, according to the exhaust gas purification system 100 of the present invention, the adhesion of the urea water in the dosing valve 104 can be prevented during the DPF regeneration, and the adhesion of the urea water in the dosing valve 104 can be prevented when the urea water is not injected by the dosing valve 104.

Further, in this embodiment, the DCU 126 is configured to perform the injection of the urea water from the dosing valve 104 prior to the DPF regeneration. However, instead of this, the DCU 126 may be configured to return (forcibly empty) the urea water inside the dosing valve 104 to the urea tank 105. Therefore, since the urea water inside the dosing valve 104 can be removed, the adhesion of the urea water in the dosing valve 104 during the DPF regeneration can be prevented. According to the exhaust gas temperature or the $NH_3$ amount accumulated in the SCR catalyst, either intermittent injection or emptying is preferable.

Further, in this embodiment, the DCU 126 is configured to intermittently discharge a small amount of urea water from the dosing valve 104 by intermittently opening the dosing valve 104 when the exhaust gas temperature is more than or equal to the crystallization temperature of the urea water and is less than the activation temperature of the SCR catalyst. However, instead of this, the DCU 126 may be configured to forcibly execute emptying (forcible emptying) by opening the dosing valve 104, switching the reverting valve 115 of the supply module 106, and operating the SM pump 112. Accordingly, since the urea water inside the dosing valve 104 can be removed prior to the crystallization of the urea water, the adhesion of the urea water in the dosing valve 104 can be prevented when the urea water is not injected by the dosing valve 104.

The invention claimed is:

1. An exhaust gas purification system comprising:
a diesel particulate filter connected to an exhaust pipe;
a selective catalytic reduction device connected to a downstream side of the diesel particulate filter;
a dosing valve for injecting urea water on an upstream side of the selective catalytic reduction device;
a supply line for supplying urea water from a urea tank to the dosing valve, and returning the urea water from the dosing valve to the urea tank;
a dosing control unit for controlling the dosing valve and the supply line in order to determine an amount of urea water to be injected from the dosing valve according to an $NH_3$ amount in the selective catalytic reduction device and an NOx amount in exhaust gas; and
an engine control module for detecting a particulate matter deposition amount in the diesel particulate filter and performing control of regeneration of the diesel particulate filter by flowing exhaust gas at a high temperature to the diesel particulate filter,
wherein the engine control module transmits a regeneration authorization request to the dosing control unit prior to the regeneration, the dosing control unit determines the $NH_3$ amount in the selective catalytic reduction device and transmits the regeneration authorization to the engine control module, when the determined $NH_3$ amount is less than or equal to a prescribed value, and the engine control module receives the regeneration authorization and executes the regeneration, and
wherein the dosing control unit controls the supply-module line to inject the urea water in the dosing valve into the exhaust pipe in order to remove the urea water from the dosing valve, when receiving the regeneration authorization request from the engine control module, replaces the urea water in the dosing valve with non-high-temperature urea water by injecting just the urea water in the dosing valve into the exhaust pipe only once, and then transmits the regeneration authorization to the engine control module, when determining that the $NH_3$ amount in the selective catalytic reduction device is less than or equal to the prescribed value.

2. The exhaust gas purification system according to claim 1, wherein the dosing control unit intermittently opens the dosing valve in order to prevent adhesion of the urea water in the dosing valve, when an exhaust gas temperature is less than an activation temperature of the selective catalytic reduction device and is more than or equal to a crystallization temperature of the urea water.

3. The exhaust gas purification system according to claim 1, wherein the dosing control unit opens the dosing valve and controls the supply line to return the urea water inside the dosing valve to the urea tank in order to prevent adhesion of the urea water in the dosing valve, when an exhaust gas temperature is less than an activation temperature of the selective catalytic reduction device and is more than or equal to a crystallization temperature of the urea water.

4. The exhaust gas purification system according to claim 2, wherein the activation temperature of the selective catalytic reduction device is more than or equal to 190° C., and the crystallization temperature of the urea water is more than or equal to 104° C.

5. The exhaust gas purification system according to claim 3, wherein the activation temperature of the selective catalytic reduction device is more than or equal to 190° C., and the crystallization temperature of the urea water is more than or equal to 104° C.

6. The exhaust gas purification system according to claim 1, wherein the supply line is provided between the urea tank and the dosing valve, and includes a pump for pumping the urea water and a reverting valve for switching a liquid feed passage by the pump.

7. The exhaust gas purification system according to claim 2, wherein the supply line is provided between the urea tank and the dosing valve, and includes a pump for pumping the urea water and a reverting valve for switching a liquid feed passage by the pump.

8. The exhaust gas purification system according to claim 3, wherein the supply line is provided between the urea tank and the dosing valve, and includes a pump for pumping the urea water and a reverting valve for switching a liquid feed passage by the pump.

9. The exhaust gas purification system according to claim 4, wherein the supply line is provided between the urea tank and the dosing valve, and includes a pump for pumping the urea water and a reverting valve for switching a liquid feed passage by the pump.

10. The exhaust gas purification system according to claim 5, wherein the supply line is provided between the urea tank and the dosing valve, and includes a pump for pumping the urea water and a reverting valve for switching a liquid feed passage by the pump.

* * * * *